United States Patent [19]

Dockter et al.

[11] Patent Number: 5,434,978
[45] Date of Patent: Jul. 18, 1995

[54] COMMUNICATIONS INTERFACE EMPLOYING UNIQUE TAGS WHICH ENABLE A DESTINATION TO DECODE A RECEIVED MESSAGE STRUCTURE

[75] Inventors: Michael J. Dockter, Hollister; Joel F. Farber; James C. Kleewein, both of San Jose, all of Calif.; Kevin D. Seppi, Austin, Tex.; David W. Tolleson, San Jose, Calif.

[73] Assignee: International Business Machines Corporation, Armonk, N.Y.

[21] Appl. No.: 198,843

[22] Filed: Feb. 18, 1994

[51] Int. Cl.6 .............................................. G06F 13/00
[52] U.S. Cl. ............................. 395/200; 364/DIG. 1; 364/DIG. 2; 364/240.8; 364/940.81
[58] Field of Search ................. 395/200, 500; 364/514, 364/DIG. 1, DIG. 2; 370/85.13

[56] References Cited

U.S. PATENT DOCUMENTS

| | | | |
|---|---|---|---|
| 4,771,391 | 9/1988 | Blasbalg | 364/514 |
| 4,774,706 | 9/1988 | Adams | 370/94 |
| 4,862,451 | 8/1989 | Closs et al. | 370/60 |
| 4,870,571 | 9/1989 | Frink | 395/200 |
| 5,007,045 | 4/1991 | Tsuzuki | 370/94.10 |
| 5,142,530 | 10/1989 | Geyer et al. | 370/85.5 |
| 5,144,622 | 9/1992 | Takiyasu et al. | 370/85.13 |
| 5,237,659 | 8/1993 | Takats | 395/200 |
| 5,263,137 | 11/1993 | Anezaki | 395/200 |
| 5,268,846 | 12/1993 | Bonsall et al. | 364/514 |
| 5,280,480 | 1/1994 | Pitt et al. | 370/85.13 |

Primary Examiner—Robert B. Harrell
Attorney, Agent, or Firm—Perman & Green

[57] ABSTRACT

A system employs communication messages in accordance with a determined protocol and includes a source node for producing messages in accordance with the protocol. Each message comprises at least a first level message structure with a unique tag value that identifies a class of message structures to which the first level message structure belongs. The unique tag value enables identification of a grammar template procedure that allows analysis of the first level message structure. A destination node receives the first level message structure and includes circuitry for determining the unique tag value. A memory in the destination node stores at addresses indicated by unique tag values, grammar template procedures for each class of first level message structures. A processor at the destination node is responsive to a detected unique tag value to access a grammar template procedure at an address in the memory determined from a received unique tag value and to analyze the first level message structure in accordance with the accessed grammar template procedure. The system also employs a second level message structure which includes a further unique tag value and comprises an assembly of groups of first level message structures.

6 Claims, 2 Drawing Sheets

COMMUNICATIONS INTERFACE EMPLOYING UNIQUE TAGS WHICH ENABLE A DESTINATION TO DECODE A RECEIVED MESSAGE STRUCTURE

FIELD OF THE INVENTION

This invention relates to distributed and client-serving data processing architectures and more particularly, to a method and system for employing tags in communications within such architectures to enable a message receiving destination to decode a received message structure.

BACKGROUND OF THE INVENTION

With the growth of "distributed" and "client-server" data processing architectures and applications, it becomes increasingly difficult to insure that messages between nodes are correctly identified and processed. Small changes in format, content, or message semantics are often experienced as new versions or releases of client processors, servers or peers (in a distributed system) are made available. The cataloging and managing of such changes on all clients and servers that are required to accommodate a new release is a difficult task, but one which must be done with absolute correctness to assure proper message interpretation.

In distributed systems, including client-server systems, messages are passed between processor-containing nodes through a communications network. Each of these messages is typically routed by a combination of hardware and software to a particular process that is to be executed on a particular node. Processes may cause further intermediate routing of a message, but eventually, the message arrives at its final destination. Upon arrival, the message is examined to determine the function which is to be performed at the node. Normally, a function code is embedded in the message and the code is used to determine the requested function. Other data in the message provides additional details of the function, parameters and data to be employed during the performance of the function.

Typically, function codes and parameters are encoded in application-specific form. Frequently, the encoding process arranges function codes in a fixed order and with a fixed offset from the beginning of a message. The meaning of the function codes and the interpretation of parameters is known only by the sending and receiving applications. As new releases of applications are prepared, encoding scheme used for the function codes may vary. Updating of sending and receiving applications thus can become a continuous and complex task - especially in widely distributed systems.

The prior art has attempted to cope with assuring correct message content identification by employing task and/or function identifiers which, when combined with accompanying operands, allow a destination system to correctly identify the required function to be performed. For instance, many computer systems communicate by transmission of messages comprising operation codes, followed by operands that are to be used during the performance of the operation defined by the operation code. The receiving processor analyzes the message and, by identifying the particular type of operation code in the message, knows the function to be performed on the operands accompanying the operation code. Due to the fact, however, that the number of operation codes are limited by the architecture of the communicating processors, only a limited number of operation codes can be implemented, are hardware fixed, and the system becomes inflexible as a result.

Recently, tags (or "tokens") have begun to be employed to identify objects, events, locations, etc. in distributed processing systems that are interconnected on a worldwide basis. Various approaches to the generation of tags have been suggested, however, in general, such approaches result in a limited population of tags. In U.S. patent application, Ser. No. 07/963,885, now U.S. Pat. No. 5,414,841, to Bingham (assigned to the same assignee as this application), an architecture and general purpose algorithm for the generation of unique tags is disclosed that is infinitely extensible, supports parallel assignments from an arbitrary large number of servers, and assures that uniqueness is maintained. The Bingham et al. architecture requires no fixed length fields and thus provides a virtually boundless tag domain.

The tag structure described by Bingham et al. includes a sequence of concatenated fields, the first field being a delimiter field that includes a delimiter character such as a "<" to serve as an initial indicator of the beginning of a tag. A tag version field follows the delimiter field and identifies a unique tag version and is generally a numeric field. A value field follows the version field and includes a string of characters that is unique for a given tag version and thus provides the unique identification for each tag. Both the string of characters in the version field and in the variable field are virtually unlimited in size.

In U.S. application Ser. No. 08/174,689, still pending as of issue of this application, (Attorney docket SA9-93-053) entitled "Tag Server System and Method that Assure Available of Globally Unique Tag Values", by Dockter et al., a tag server system is described which provides unique tag values to requesting client systems. The tag server system includes a processor which generates an inventory of unique tag values, such values being generated by monotonically increasing a value within the tag value field. Those generated values are stored, a non-volatile memory stores the highest unique tag value generated by the processor. Should tag values be lost as a result of a data loss failure mode, the highest unique tag value is accessed from the non-volatile memory and the processor in the tag server commences generation of new unique tag values monotonically from the accessed value and expends no effort to regenerate lost unique tag value. In this manner, uniqueness of tag values is continuously assured (although not their sequential state).

Accordingly, it is an object of this invention to employ globally unique tag values to enable more efficient communications in distributed data processing architectures.

It is another object of this invention to employ globally unique tag values as identifiers for communications messages, such that a destination node is capable, by recognition of the unique tag value to correctly analyze a received message.

It is yet another object of this invention to provide an improved communications interface between data processing nodes, wherein destination nodes and source nodes both contain a library of unique tag values and associated grammar templates to enable decoding of received messages, whereby receipt of a unique tag value immediately enables accessing of an associated grammar template.

It is still another object of this invention to provide a communications interface data protocol which enables complex message structures to be identified by accompanying unique tag values.

SUMMARY OF THE INVENTION

A system employs communication messages in accordance with a determined protocol and includes a source node for producing messages in accordance with the protocol. Each message comprises at least a first level message structure with a unique tag value that identifies a class of message structures to which the first level message structure belongs. The unique tag value enables identification of a grammar template procedure that allows analysis of the first level message structure. A destination node receives the first level message structure and includes circuitry for determining the unique tag value. A memory in the destination node stores at addresses indicated by unique tag values, grammar template procedures for each class of first level message structures. A processor at the destination node is responsive to a detected unique tag value to access a grammar template procedure at an address in the memory determined from a received unique tag value and to analyze the first level message structure in accordance with the accessed grammar template procedure. The system also employs a second level message structure which includes a further unique tag value and comprises an assembly of groups of first level message structures.

DETAILED DESCRIPTION OF THE INVENTION

Figure 1:
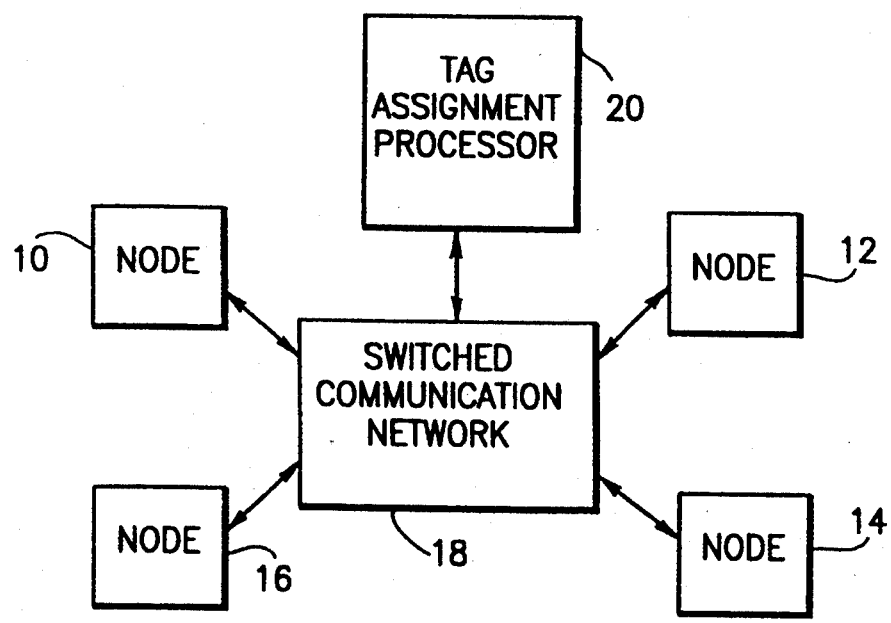
FIG. 1 is a block diagram of a distributed nodal system that employs the invention hereof.

Referring to FIG. 1, a distributed processing system includes a plurality of nodes 10, 12, 14 and 16, all connected by a switched communications network 18. Each node may be either a source node or a destination node. A source node is one which constructs a message. A destination node is one which receives the message, analyzes it and performs a procedure required by the message. Each source node constructs a message in accordance with a determined protocol that defines at least two data structures. A first data structure is termed a "sentence" and is the first level message structure used by the system of FIG. 1. A second level message structure comprises a plurality of sentences, termed a "paragraph". Each sentence commences with a field containing a globally unique tag or identifier which is uniquely related to a procedure to be employed when analyzing the sentence.

A variable field value within the tag is recognized by a destination node as identifying a particular procedure to be performed upon the message which contains the tag. In specific, the variable field value identifies an address in memory in the destination node wherein there is stored a grammar template procedure which precisely defines: how the various fields within a received sentence containing the unique tag are to be handled; which portion of the sentence defines a function command; which portion of the sentence includes operands, subsidiary commands; etc. Thus, by analyzing a received unique tag value, a destination node can identify and access all information required to properly analyze the received message (sentence).

As will be understood from the description below, unique tag values are derived from a remote tag assignment processor 20. Each tag value received by the system shown in FIG. 1 is applied to a class of sentence structures that are to be processed identically in terms of a grammar template procedure. If there is any change in the grammar template procedure, a new globally unique tag value is assigned to the new grammar template procedure. The new tag value and new grammar template procedure are stored within each of nodes 10, 12, 14 and 16 to enable proper identification of the revised grammar template procedure upon receipt of a new unique tag value. No attempt is made to update a previous unique tag value which enabled analysis of an earlier version of the now-changed grammar template procedure.

Figure 2:
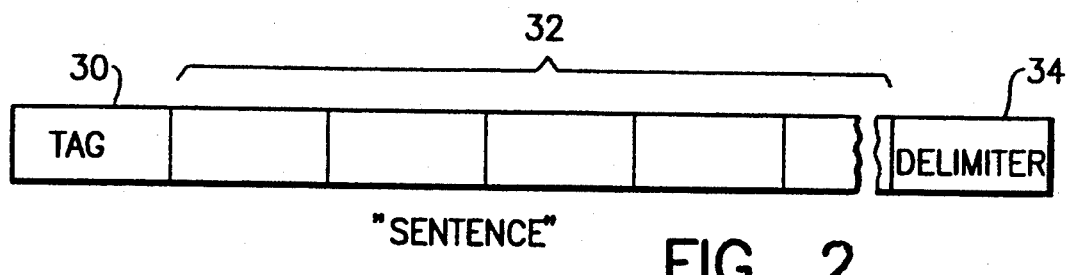
FIG. 2 is a diagrammatic showing of a "sentence" whose initial field includes a unique tag value.

As above indicated, at the lowest level messages are structured into sentences, an example of which is shown in FIG. 2. Each sentence includes a first field 30 that includes a unique "type" tag value. The sentence includes further fields 32, each of which is of a variable length. A sentence ends with a delimiter in the last-field 34. A preferred delimiter is a "period" in field 34. Each sentence includes a fixed number of fields that is invariable; however, as aforesaid, each of fields 32 is of variable length.

An exemplary sentence may be as follows:

"<1AA111", "userid", "hostid", "."

The quotation marks delimit each field, with an intervening comma used to divide the fields of the sentence. In the first field of the sentence shown above, the "<" is a tag delimiter, the number "1" indicates that the tag is from version 1; the letters "AA" identify the tag assignment processor from which the tag value was received; the next "1" is a check digit and the last two values "11" represent a number to the base 36 (i.e. 26 letters plus 10 digits) which identifies the specific type of sentence. The succeeding fields contain a user identifier and a host identifier and the sentence ends with a period. The "<1AA111" tag value is used by a destination node to identify a procedure to which the user I.D. and host I.D. values are to be subjected. For instance, the "<1AA111" tag value may indicate that the user I.D. and host I.D. values are to be stored in specific registers within the destination node. It is only from the grammar template procedure accessed through the use of the "<1AA111" tag that the grammar template procedure can be identified and carried out.

Figure 3:
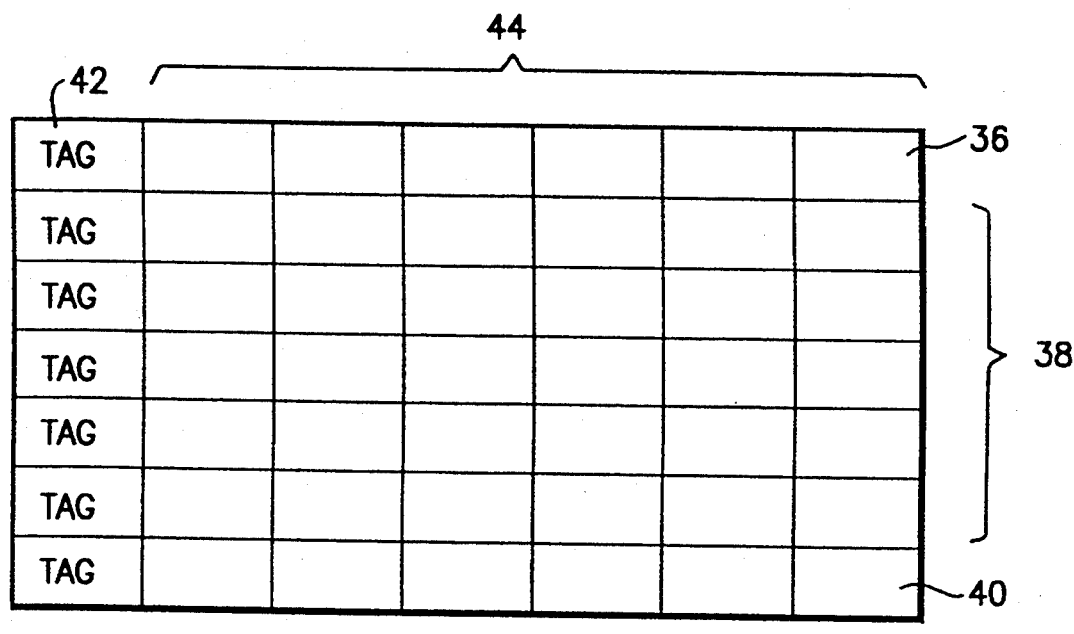
FIG. 3 is a diagrammatic representation of a paragraph comprising plural sentences, each sentence beginning with a unique tag value.

In FIG. 3, a paragraph is shown schematically and comprises a plurality of sentences 36, 38 and 40. Initial sentence 36 commences with a tag value 42 (as do all sentences). The variable field portion of tag value 42, upon being received by a destination node, enables the destination node to access a grammar template procedure which will enable the remainder of the paragraph to be analyzed. Assuming that sentences 38 comprise a list, tag 42 will enable access of a grammar template procedure that defines a "begin-list" procedure. Based upon the number of sentences, the begin-list procedure employ data from fields 44 in initial sentence 36 to determine where to commence storage of the data listed in sentences 38. Final sentence 40 of the paragraph shown in FIG. 3 is an "end-list" command and terminates the list procedure in the destination node.

While paragraphs are often sufficient to construct a message, it may be necessary to send a set of paragraphs before waiting for a reply. In a preferred embodiment, a higher level message structure called a "story" may be employed to control the flow of requests and replies. A story will also begin with a sentence that includes a unique tag value that enables a destination node to access a grammar template procedure which will properly analyze the paragraphs yet to come. A story will also end with a sentence that commences with a tag indicating a "story-end".

Figure 4:
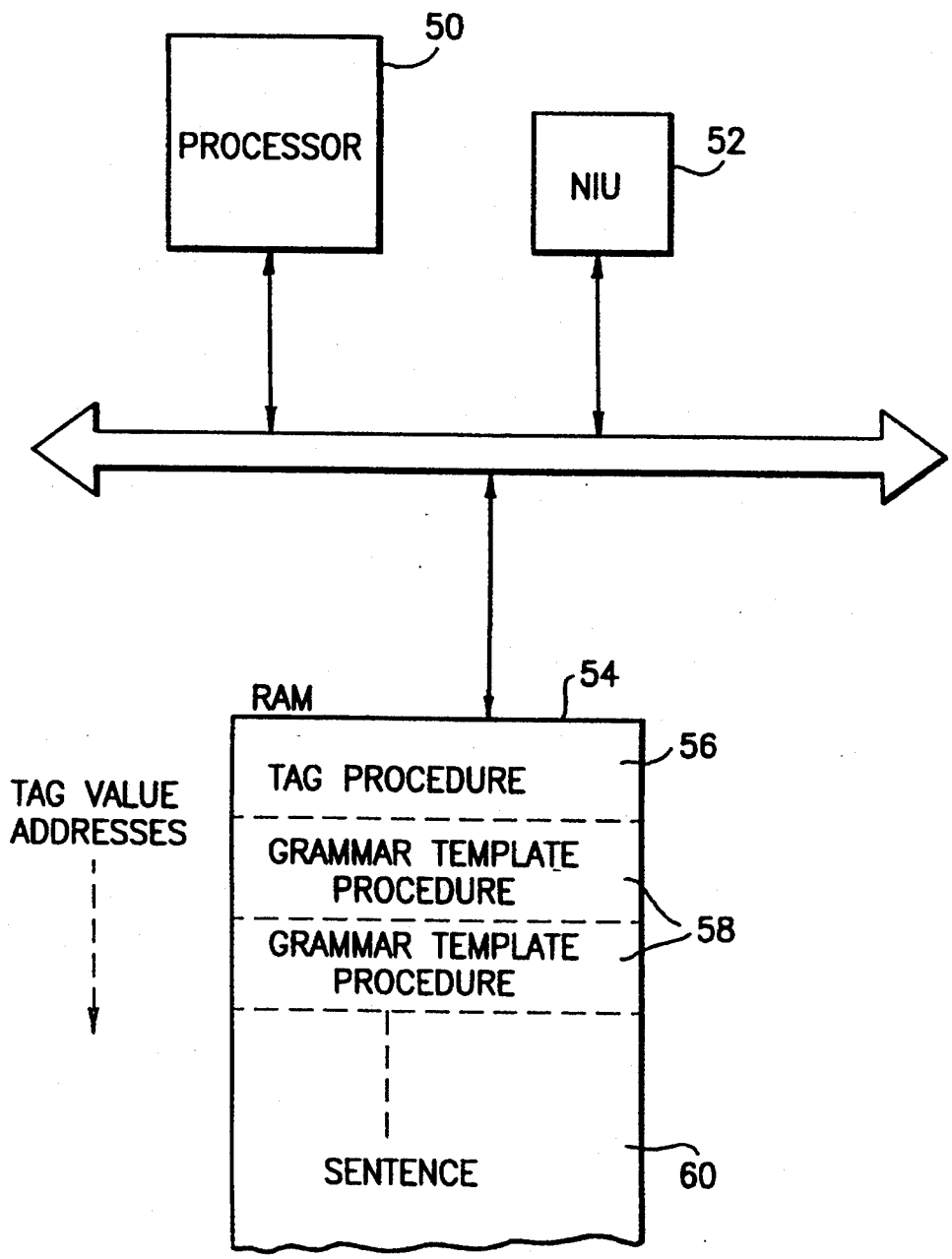
FIG. 4 is a high level block diagram of a node illustrating stored procedures that enable received tags to be identified and enable access to grammar template procedures for analysis of a received sentence including a tag.

Turning to FIG. 4, a high level block diagram of a node is shown and includes a processor 50, a network interface unit 52 and a random access memory (RAM) 54. RAM 54 includes a tag procedure 56 which enables processor 50 to construct sentences, paragraphs, etc. Tag procedure 56 further includes a sub-procedure which enables analysis of a received tag value to determine the particular variable field value contained within a received unique tag. Once that value has been determined, it is used to address an associated grammar template procedure 58 stored within RAM 54. That template procedure is then accessed and is employed to analyze a sentence 60 that has been buffered in ram 54.

The above-described message structure provides a number of advantages. Software controlling the destination node can be simplified because the tag value alone is sufficient to determine what action is appropriate. Each tag is universally uniquely identified and is not just unique within a specific application. Complex data structures and protocols are easily managed because all data structure parts can be uniquely identified. More specifically, should a portion of a message be lost (e.g., sentences within a paragraph), by "backing up" to identify the beginning of a paragraph, message recovery can easily commence. Migration and fall back of code levels is simplified because all versions of unique tag values are simultaneously supported. Clearly, certain tag values will become obsolete and can be dropped from storage.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed:

1. A system employing communication messages in accord with a determined protocol that includes plural classes of first level message structures, each class having a unique syntax, all first level message structures of a class evidencing an identical syntax, each class identified by a unique tag value, said protocol further including a second level message structure comprising a group of said first level message structures, said second level message structure including a further unique tag value, said system comprising:

plural source means for producing messages in accord with said protocol, each message comprising at least a first level message structure with a unique tag value that identifies a class of first level message structures to which said first level message structure belongs and further enables identification of one of a plurality of grammar template procedures that uniquely will allow analysis of a class of first level message structures to which said first level message structure belongs; and plural destination means for receiving first and second level message structures from said plural source means, each destination means including means for detecting unique tag values received with said first and second level message structures, memory means for storing at addresses indicated by unique tag values and further unique tag values, plural grammar template procedures for said classes of first level message structures and second level message structures, and processor means, a processor means receiving a first level message structure with a unique tag value or a second level message structure with a further unique tag value responsive to said unique tag value to access a grammar template procedure at an address in said memory determined therefrom, and to analyze said received message structure bearing said unique tag value in accord with said grammar template procedure.

2. The system as recited in claim 1 wherein said first level message structure is a "sentence" having a predefined number of fields, each field having a variable length so as to enable storage of data of variable value magnitudes, a first field in a sentence including a said unique tag value, and a last field in a sentence including a sentence termination indication.

3. A system as recited in claim 2 wherein said second level message structure is a "paragraph", a paragraph commencing with a first sentence with a unique tag value which defines a class for said paragraph and enables said destination memory to access a grammar template therefrom.

4. A system as recited in claim 3 wherein said first sentence includes a unique tag value which identifies said sentence as "begin list" sentence, said paragraph including plural additional sentences which comprise said list, a last sentence of a said paragraph including a unique tag value which identifies said sentence as an "end list" sentence.

5. The system as recited in claim 1, wherein each unique tag value includes a unique numerical value that is never encountered by said system except for identical class message structures, each class message structure requiring use by said processor means of an identical grammar template procedure to enable analysis of said class of message structure.

6. The system as recited in claim 1 wherein any modification to a class of message structure which requires a modified grammar template procedure is assigned a new unique tag value, said memory means in said destination means storing said modified grammar template procedure at an address corresponding to said new unique tag value.

* * * * *